Patented Feb. 1, 1944

2,340,584

UNITED STATES PATENT OFFICE 2,340,584

AZO SULPHONAMIDE COMPOUNDS AND METHOD OF PRODUCING THE SAME

Max Dohrn, Berlin-Charlottenburg, and Paul Diedrich, Finkenkrug, Osthavelland, Germany, assignors to Schering Corporation, Bloomfield, N. J., a corporation of New Jersey No Drawing. Application December 21, 1937, Serial No. 180,942. In Germany December 30, 1936

15 Claims. (Cl. 260—200)

The present invention relates to azo compounds of acid character and a method of producing the same.

In German Patents Nos. 607,537, 610,320 and 638,701 compounds are already described in which one nucleus attached to the azo bridge possesses one sulphonic acid amide group in p-position or two such groups in any positions, while the other residue attached to the azo bridge must possess in addition to other groups a nuclearly bound nitrogen atom, which can form a member of a ring.

In accordance with the present invention, in the latter nucleus the presence of the specified nuclearly bound or cyclically bound nitrogen atom is not necessary for the production of highly bactericidal compounds. In fact the compounds obtained according to the present process are distinguished by their particular bactericidal properties. In the present process as coupling components nitrogen free compounds of the naphthalene series, especially naphthol sulphonic acids, capable of coupling are employed.

As diazotised components with a sulphonic acid amide group the compounds described in the above mentioned specifications are suitable such as para-aminobenzene sulphonamide, aminobenzene-sulphonalkylamides for example, the dimethylamide, and others.

The new compounds are distinguished by the high water-solubility of their salts and by the neutrality of their solutions, because of which they appear to be particularly suitable for intravenous application.

The following examples serve to illustrate the invention without, however, limiting the same to them:

EXAMPLE 1

*4 - sulphonamido - phenyl - azo-1'-(2' - hydroxy-naphthalene-6'-sulphonic acid)*

17.2 grams of 4-aminobenzene-sulphonamide are dissolved in 150 ccs. of water and 25 ccs. of hydrochloric acid and diazotised at 0° C. with a solution of 6.9 grams of sodium nitrite, and coupled with ice cooling with a solution of 22.4 grams of 2.6-naphthol-sulphonic acid containing excess of ammonia. The deep dark red solution thereby obtained is thereupon weakly acidified and salted out with common salt. The dyestuff is easily water soluble. It can also be isolated by the addition of calcium chloride in the form of a difficultly water-soluble calcium salt from the reaction solution.

EXAMPLE 2

*4-sulphonamido-phenylazo-1'-(2'-hydroxy-naphthalene-7'-sulphonic acid)*

17.2 grams of 4-aminobenzene-sulphonamide are diazotised and coupled in solution alkaline with sodium carbonate with a solution of 24.6 grams of the sodium salt of 2-naphthol-7-sulphonic acid. The solution is after filtration acidified and the brown dyestuff precipitated by salting out. The sulphonic acid filtered with suction is present in the form of its monosodium salt and is purified by washing with concentrated and thereupon with 10% common salt solution. The yield amounts to about 60% of the theory.

EXAMPLE 3

*4-sulphonamido-phenylazo-1'-(2'-hydroxy-naphthalene-8'-sulphonic acid)*

17.2 grams of diazotised 4-aminobenzenesulphonamide are coupled, in solution alkaline with sodium carbonate, with an aqueous solution of 24.6 grams of the sodium salt of 2-naphthol-8-sulphonic acid, and according to the method described in Example 2 the sodium salt of the sulphonic acid obtained as a brick red water-soluble powder. The yield amounts to 30 grams.

EXAMPLE 4

*4-sulphonamido-phenylazo-2'-(1'-hydroxy-naphthalene-4'-sulphonic acid)*

17.2 grams of diazotised 4-aminobenzene-sulphonamide are coupled, in solution alkaline with sodium carbonate, with a solution of 24.6 grams of the sodium salt of 1-naphthol-4-sulphonic acid and the coupling product, after filtration of the blood red solution, caused to separate by acidification with hydrochloric acid. The further working up takes place as under Example 2. The sodium salt of the azo dyestuff obtained forms a water-soluble dark red powder.

EXAMPLE 5

*4-sulphonamido-phenylazo-2'-(1'-hydroxy-naphthalene-5'-sulphonic acid)*

17.2 grams of diazotised 4-aminobenzene-sulphonamide are coupled, in solution alkaline with sodium carbonate, with a solution of 24.6 grams of the sodium salt of 1-naphthol-5-sulphonic acid. The customary working up yields the azo-dyestuff as a dark red sodium salt which is easily soluble in water.

EXAMPLE 6

*4-sulphonamido-phenylazo-1'-(2'-hydroxy-naphthalene-3'.6'-disulphonic acid)*

17.2 grams of diazotised 4-aminobenzene-sulphonamide are coupled with ice cooling, in solution alkaline with sodium carbonate, with an aqueous solution of 34.8 grams of the sodium salt of 2-naphthol-3.6-disulphonic acid. By acidification and salting out, the coupling product is obtained as a cinnabar red powder. It is the disodium salt of the azo dyestuff and as such easily soluble in water. The yield amounts to 40 grams.

EXAMPLE 7

*4-sulphonamido-phenylazo-1'-(2'-hydroxy-naphthalene-6'.8'-disulphonic acid)*

By coupling of a solution of 17.2 grams of diazotised 4-aminobenzene-sulphonamide and a solution of 34.8 grams of the sodium salt of 2-naphthol-6.8-disulphonic acid, after the customary working up, the disodium salt of the azo dyestuff is obtained in orange red needles. The yield amounts to 38 grams.

EXAMPLE 8

*4-sulphonamido-phenylazo-2'-(1'-hydroxy-naphthalene-3'.6'-disulphonic acid)*

17.2 grams of diazotised 4-aminobenzene-sulphonamide coupled with 34.8 grams of the sodium salt of 1-naphthol-3.6-disulphonic acid, yield according to the method of working of Example 7, 35 grams of the disodium salt of the dyestuff. The light red product is easily soluble in water.

EXAMPLE 9

*4-sulphonamido-phenylazo-2'-(1'-hydroxy-naphthalene-3'.8'-disulphonic acid)*

The disodium salt of this acid is obtained as described in Example 8 except that the sodium salt of 1-naphthol-3.8-disulphonic acid is employed instead of the sodium salt of 1-naphthol-3.6-disulphonic acid, the product being a dark red easily water-soluble powder. The yield amounts to 32 grams.

EXAMPLE 10

*4-sulphonamido-phenylazo-2'-(1'-hydroxy-naphthalene-4'.8'-disulphonic acid)*

This disulphonic acid is obtained as described in Example 8 as disodium salt by the application of the sodium salt of 1-hydroxy-naphthalene-4.8-disulphonic acid as coupling component. The dark red sodium salt is easily soluble in water. It can likewise be isolated from its solutions by salting out.

The compounds according to the present invention can obviously be produced otherwise than by coupling of a diazotised amino-sulphonamide with the acid aromatic components, even if these processes possess less practical importance. Thus also the azo bridge or the sulphonic acid amide group can be produced in the last phase or also the acid group can be introduced into the aromatic residue after the manufacture of the azo compound. For this purpose processes come into question as correspond to the processes set forth in German specifications Nos. 607,537, 610,320 and 638,701. The above alternative processes are to be considered as chemical equivalents of the coupling process.

Of course, many changes and variations in the reaction conditions and the like may be employed by those skilled in the art in accordance with the principles set forth herein and in the claims annexed hereto.

What we claim is:

1. Process for the manufacture of azo compounds of acid character, comprising coupling a diazo benzene having a sulphonamide group in the para-position to the azo group, with a nitrogen-free naphthol sulphonic acid.

2. Process according to claim 1, wherein para-aminobenzene-sulphonamide is diazotised and coupled with a 2-naphthol-sulphonic acid.

3. Process as claimed in claim 1, in which a 4-aminobenzene-sulphonamide is diazotised and coupled with a 2,8-naphthol-sulphonic acid.

4. Process as claimed in claim 1, in which a 4-aminobenzene-sulphonamide is diazotised and coupled with 2,6-naphthol-sulphonic acid.

5. Process as claimed in claim 1, in which a 4-aminobenzene-sulphonamide is diazotised and coupled with 2-naphthol-6,8-disulphonic acid.

6. Process as claimed in claim 1, in which a 4-aminobenzene-sulphonamide is diazotised and coupled with a nitrogen-free naphthol-disulphonic acid.

7. Azo compounds one of whose radicals attached to the azo bridge is a benzene nucleus having one sulphonamide group in the para-position to the azo group, while the other radical is a nucleus of the naphthol series and is substituted by at least one sulphonic group.

8. A 4-sulphonamidophenylazo-naphtholdisulphonic acid.

9. A 4-sulphonamidophenylazo-1'-(2'-hydroxynaphthalene sulphonic acid).

10. P-sulphonamide-benzene-azo-naphthol sulphonic acids.

11. A 4-sulphonamidephenylazo-1'-(2'-hydroxynaphthalene-6'-sulphonic acid) compound of the general formula $C_{16}H_{13}O_6N_3S_2$ and the structural formula

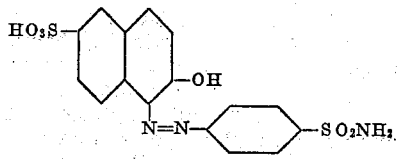

12. A 4-sulphonamidephenylazo-1'-(2'-hydroxynaphthalene-8'-sulphonic acid) compound of the general formula $C_{16}H_{13}O_6N_3S_2$ and the structural formula

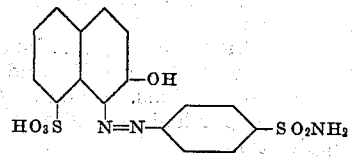

13. A 4-sulphonamidephenylazo-1'-(2'-hydroxynaphthalene-6',8'-disulphonic acid) compound of the general formula $C_{16}H_{13}O_9N_3S_3$ and the structural formula

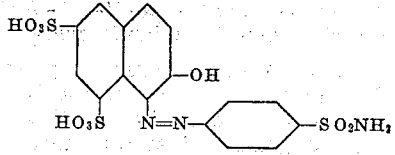

14. A composition prepared for administration into the human organism and comprising a p-sulphonamide-benzene-azo-naphthol-sulphonic acid.

15. A composition prepared for administration into the human organism and comprising a p-sulphonamide-benzene-azo-naphthol-disulphonic acid.

MAX DOHRN.
PAUL DIEDRICH.